…

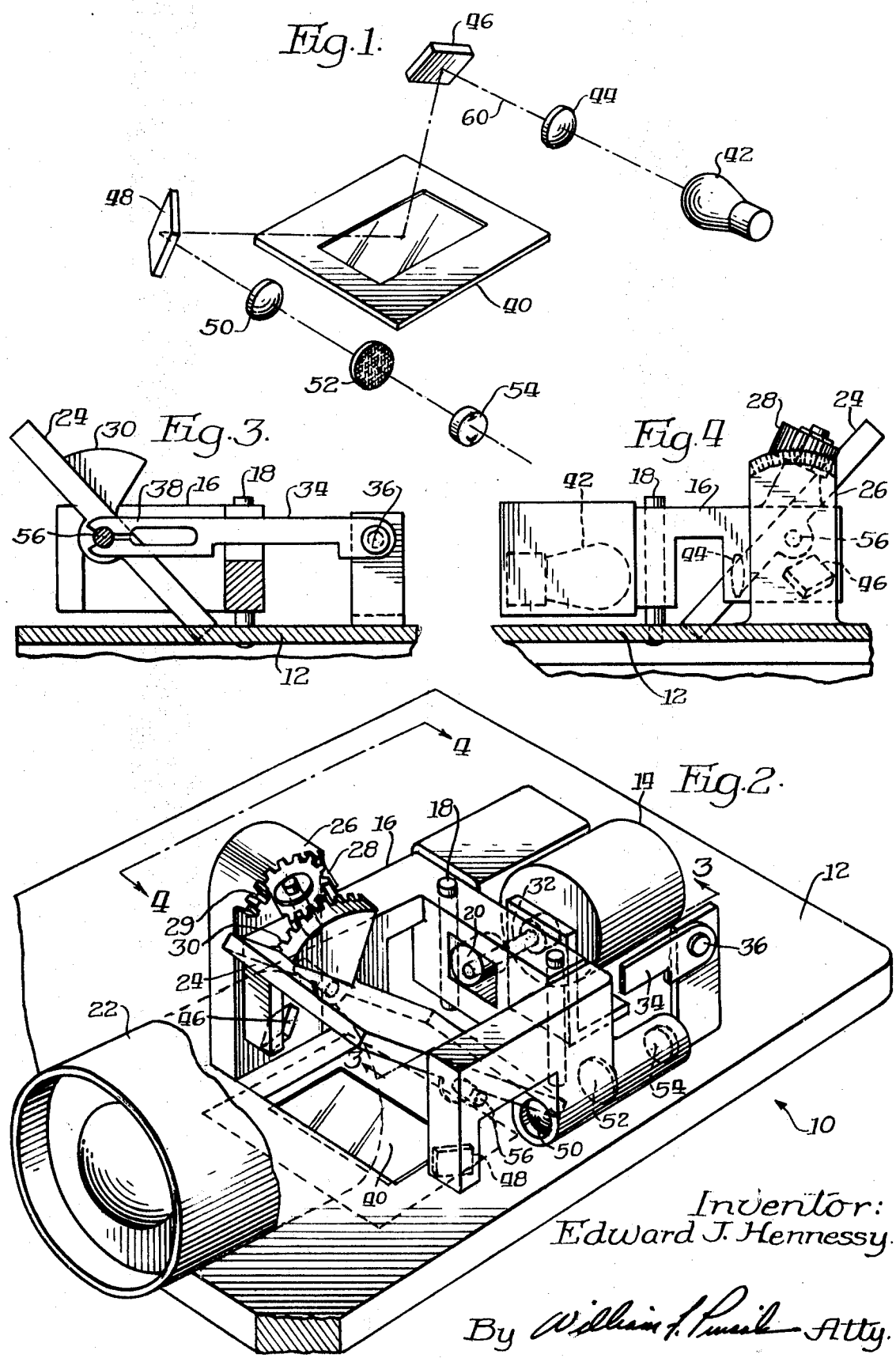

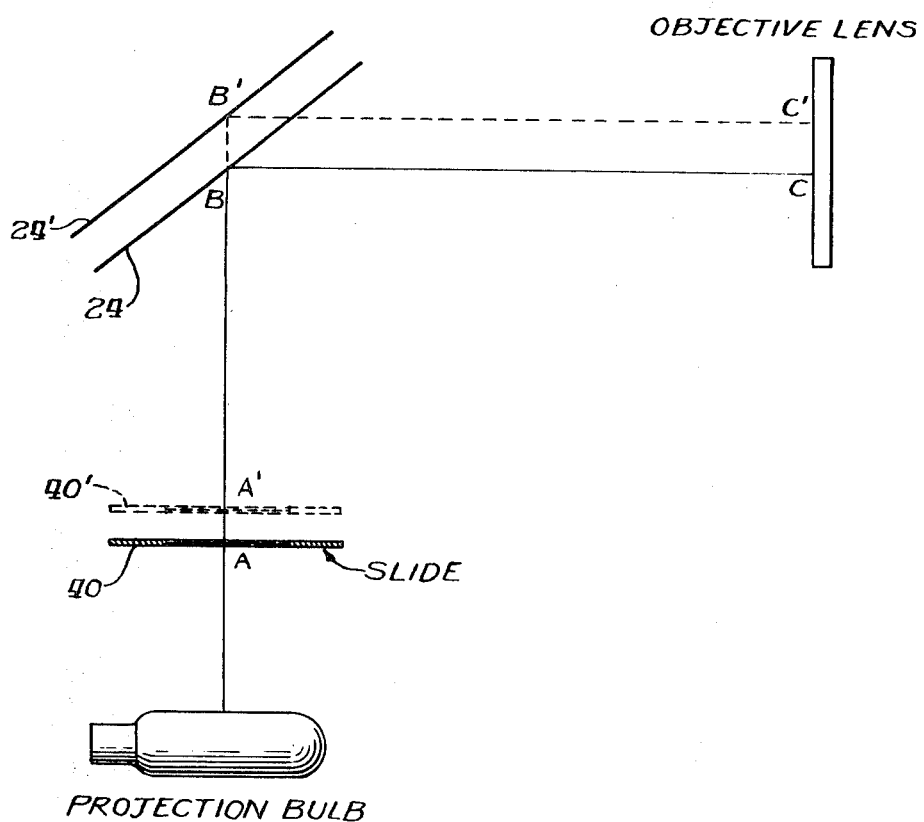

United States Patent Office 3,606,530
Patented Sept. 20, 1971

3,606,530
FOCUS MAINTAINING DEVICE
Edward J. Hennessy, Hoffman Estates, Ill., assignor to Bell & Howell Company, Chicago, Ill.
Filed Sept. 23, 1969, Ser. No. 860,858
Int. Cl. G03b 3/12
U.S. Cl. 353—101    3 Claims

ABSTRACT OF THE DISCLOSURE

A focus maintaining film projector that maintains focus by altering the position of a reflecting surface in a folded projection system.

CROSS-REFERENCES TO RELATED APPLICATIONS

This application is related to applications Ser. No. 860,384, filed Sept. 23, 1969; S.N. 860,857, filed Sept. 23, 1969, now abandoned; and S.N. 860,856, filed Sept. 23, 1969.

BACKGROUND OF THE INVENTION

This invention relates generally to the field of slide projectors and more particularly to an automatic focus maintaining system hereinafter referred to as auto-focus, associated with a slide projector.

An auto-focus system, designed to maintain sharp focus of a projected image, greatly enhances the value of a slide projector to the user. By dispensing with the need for manual adjustment of the focusing apparatus the user may concentrate on an orderly presentation of a quality slide program, without interruption to adjust poor focus caused by individual characteristics of photographic slides.

Ideally the plane of the slide image to be projected would at all times be in constant positioned relationship to the projector's focusing lens. Under those conditions, a projector could easily be constructed that would require a single focusing at the beginning of a presentation and no further adjustment would be necessary. However, as a series of slides is presented, variations in position occur and the focus must then be altered to accommodate such variations. Individual characteristics of slides may occur in a variety of ways. Individual differences in image and mounting materials, effectiveness of the mounting operation, humidity in the storage and projection areas, and length of projection time among others may cause variations in image position in the projecting apparatus. The phenomenon known as "popping," a change in image plane associated with the heating effect of the projection lamp, can be particularly disconcerting to the user since it occurs while a given slide is being viewed, after initial focusing for that particular slide. In fact the image area may warp or "pop" in one direction necessitating a focal adjustment and subsequnently "pop" a second time, quite possibly in a different direction, causing another change in focus. An auto-focus system that rapidly responds to such variations, quite apparently, adds immeasurably to the enjoyment and convenience of the projector.

The development of the slide projector more fully described in the above-identified applications: a projector which transports and presents slides to the projection apparatus with the slide image in a horizontal plane resulted in a re-thinking of conventional auto-focus systems. Desiring to maintain the slide image plane horizontal, a projection system was developed in which a projection mirror positioned over the slide bends or folds light from a projection lamp underlying the slide into a generally horizontal direction. The thus folded light path then passes through a focusing lens and ultimately reaches a generally vertical viewing area, such as a conventional screen. As described in the above-identified applications, the mirror and focusing lens may be so related that their positions may be adjusted to raise or lower the image on the viewing area. Obviously, in that case, the folded portion of the light path would not be horizontal and in fact could be widely divergent from the horizontal.

Conventionally, slide projection systems place the slide image plane in a vertical orientation and the image is projected directly through a focusing lens onto a viewing area. Accordingly prior auto-focus systems have included an appraisal component which determines the position of the image plane relative to the focusing lens and a servo-mechanism linking the appraisal component to an adjusting component. The adjusting component functioned to alter the position of either the slide or the focusing lens in response to the determination of the appraisal component and thereby maintain proper focus of the image. These systems tend to require complicated linkages and are at best cumbersome.

Moreover, they could not be readily adapted to a projector of the type described in the above-identified copending applications. Thus a new approach was sought to automatically maintain the focus of the novel horizontal image plane projector above-described. Quite unexpectedly this invention discovered that vertical movement of the projection mirror altered the focus of a projected image. Implementing that discovery proved to be a simple, economical and reliable system when applied to the above-described projector. To maintain the image position on the viewing screen during the focusing vertical motion of the projection mirror, novel apparatus has been developed to slightly tilt the projection mirror simultaneously with the focusing movement.

SUMMARY

This invention presents an auto-focus system designed for use in folded projection systems. An appraisal system determines the position of the projected slide and through a servo-mechanism translates its determination into movement of a projecting mirror. The movement of the mirror alters the focus of the projected image and maintains the focus substantially constant from slide to slide and also responds to any focus changes occurring during projection of a single slide. Furthermore this invention presents means which maintain image position upon the viewing area during the focus maintenance operation.

BRIEF DESCRIPTION OF THE DRAWINGS

The features of this invention will become more apparent in the following detailed description and drawings wherein:

FIG. 1 is a partial schematic of the appraisal component of the invention.

FIG. 2 is a perspective view of the invention partially showing the appraisal component in FIG. 1.

FIG. 3 is a sectional view taken along line 3—3 of FIG. 2 looking in the direction of the arrows.

FIG. 4 is a sectional view taken along line 4—4 in FIG. 2 looking in the direction of the arrows.

FIG. 5 is a schematic illustration of the operating principles of the invention.

DETAILED DESCRIPTION OF A PREFERRED EMBODIMENT

FIG. 2 shows projection apparatus, indicated generally at 10, mounted upon a housing 12. The above-mentioned applications may be referred to for a more detailed description of the projector. For purposes of understanding this invention, only the relevant areas have been illustrated to aid in a clear understanding of this invention.

A slide 40 lies in a horizontal plane within the projector. Illumination from a projection bulb (not shown) underlying the slide 40, intercepted by a projection mirror 24, will be folded substantially coincident with the longitudinal axis of the projection barrel 22 and also substantially coincident with the optical axis of a focusing lens (not shown) contained within the projection barrel 22. Thusly the image of the slide 40 may be projected onto a viewing area (not shown).

For present purposes, the projection barrel 22 will be described as fixedly mounted on the stationary platform 12 with its longitudinal axis parallel to the plane of the slide 40 which also is in fixed relation to the platform 12. Rotatably mounted at 56 to the movable housing 16, the reflecting plane of the projection mirror 24 initially is orientated at 45° angle with the slide 40. Therefore a vertical ray of light from the projection bulb (not shown) will be folded by the reflecting surface along the longitudinal axis of the projection barrel.

A bi-directional motor 14 connected by a shaft 32 to an eccentric 20 which contacts an undersurface of the housing 16 serves to raise and lower the housing 16 which is slideable in a vertical direction along two posts 18. Activating the motor 14 rotates the eccentric 20 which alternately raises and/or lowers the housing 16. Since the projection mirror 24 is supported by the housing 16 it also will be raised and/or lowered relative to the slide 40. Such a movement of the projection mirror 24 lengthens, if the projection mirror 24 is raised, the light path from the slide image to the reflecting surface of the projection mirror 24. Conversely, should the projection mirror be lowered, that path will be shortened.

Shown schematically in FIG. 5, light from a projection bulb passes through a slide 40 at A is reflected by a mirror 24 at B and impinges on an objective lens at C. Thusly an optical path length ABC is defined and ideally would correspond to the focal length of the objective lens, but it need not be, in a workable system. The initial condition, i.e., when the slide 40 rests at A, shall be assumed to be in proper focus. Should a second slide 40′ be inserted into the projector after slide 40 has been ejected, unless compensation is made the optical path length will be A′BC, quite obviously shorter than ABC and therefore the projected image will not be focused the same as when slide 40 was in the projector. This invention compensates for that change by moving the projection mirror 24 vertically such that A–A′ equals B–B′. Since A′B′ equals AB and B′C′ equals BC, the new optical path distance A′B′C′ equals ABC, the initial path distance, and the original focus is thusly maintained.

Although the movement of the mirror 24 has been described as vertical in the schematic and the preferred embodiment, it should be apparent from the schematic that horizontal or movement at any angle to the plane of the mirror 24 could produce the same result. The only limiting factor being the relationship of mirror and image size. Furthermore should the change in slide plane be in a downward direction the mirror would also be moved a corresponding distance until an optical path equal to ABC is obtained.

The motor 14 is selected and connected to the eccentric 20 in a manner calculated to provide rapid adjustment of the focus. Furthermore, the motor responds rapidly to the determination of slide position appraised by the system depicted in FIG. 2. Therein is seen a radiation source 42, a focusing lens 44, a directing mirror 46, a slide 40, a second directing mirror 48, a second focusing lens 50, a filter 52, and a photo-electric cell assembly 54. As shown schematically, a beam 60 comprising infrared radiation follows the above sequence in traveling from the source 42 to the photo-electric cell component 54. The beam 60 is focused on the center of the slide 40 since that generally comprises the area of maximum viewer interest although it should be apparent that other points on the slide 40 could be selected. The filter 52 is optional but here is included to filter visible light from the projection bulb and pass the infra-red radiation of the source 42. The appraisal assembly shown in FIG. 1 is mounted on the underside of the housing 16. The component parts maintain the same relative relationship as in FIG. 1 and although for reason of clarity all of the components are not shown in FIG. 2 some 54, 52, 48 and 46 have been depicted therein mostly in phantom. Thus vertical movement of the housing 16 carriers with it the appraisal assembly shown in FIG. 1.

A change in the horizontal elevation of the slide 40 from the original focus setting changes the place of incidence of the beam 60 on the photo-electric cell component 54. That change causes the motor 14 to rotate the eccentric 20 in a proper direction to raise and/or lower the housing 16 which action continues until the beam 60 returns to its original point of incidence on the photo-electric cell 54.

The details of translating changes of beam incidence on the photo-electric cell component 54 into proper activation of motor 14 and a suitable apparatus for accomplishing that task are set forth in U.S. Pat. No. 3,342,102, issued on Sept. 14, 1967 and commonly owned by the assignee of record herein.

To summarize the co-action of the appraisal system and the adjusting system assume that with the apparatus in the position shown in FIGS. 1 and 2 the image is properly focused. Assume further that the image portion of the slide in FIGS. 1 and 2 suddenly "pops" or bows downwardly thus de-focusing the projected image. As the slide image moves downwardly, the beam 60 changes its point of incidence on the photo-cell component 54. That change is translated, for example by apparatus disclosed in U.S. Pat. No. 3,342,102, into proper activation of the motor 14. The motor rotates the eccentric 20, in this case counter-clockwise, until the housing 16 lowers to a point where the porjecting mirror 24 reaches exactly the same optical distance from the slide 40 as in the initial position. When that position is reached, the image will once again be in focus on the viewing area and the beam 60 will impinge the initial spot on photo-electric component 54 thereby de-activating the motor 14. Thus maintenance of a properly focused image is rapidly and automatically effected.

Vertical movement of the projection mirror 24 during a focus maintaining cycle changes the position of the projected image on the viewing area opposite to the movement of the projection mirror 24. Should the focus adjustment be severe, the motion on the screen could be disconcerting to the veiwer. Two mechanisms which may be used separately or in conjunction with one another prevent image displacement on the viewing area during a focus maintaining movement of the projection mirror 24.

Firstly, a face gear segment 30 is fixed to the rotatably mounted mirror 24. A pinion gear segment 28, rotatably mounted on a post 29 which projects at an acute angle from the housing 16, meshes with the face gear segment 30. Of course, vertical movement produces like movement of gear segments 28 and 30. A second face gear segment 26, rigidly mounted to the stationary platform 12, meshes with the pinion gear segment 28. Because the pinion 28 is angularly related to both the housing 16 and the stationary face gear segment 26, the pinion 28 must rotate during vertical movement of the housing 16. Such a rotation, of course, produces rotation of the mirror 24 and the system is so constructed that during vertical movement of the housing 16 exactly the proper amount of rotation is produced in the mirror 24 to maintain constant positioning of the image on the viewing area.

At this point, it should be pointed out that although the auto-focus system and the image maintenance system have been described in conjunction with a stationary projection barrel, the systems are readily combined with a tilting mechanism such as that set out in co-pending application Ser. No. 860,857, filed Sept. 23, 1969, now abandoned. In that case gear segments 26, 28 and 30 would be part of the gear train shown therein to effect tilting of the projection barrel 22 and a corresponding rotation of the projection mirror 24 of one-half the amount.

A second means for maintaining vertical orientation of the image on the viewing area is shown in FIG. 3 and partially in FIG. 2. A stabilizing bar 34 is pivotally mounted to the stationary platform 12 at 36. The other end of the bar 34, split at 38, frictionally grips the axle 56 on which the mirror 24 is mounted. The frictional force is great enough to rigidly hold the axle during a vertical movement of the housing 16 thereby causing the mirror to rotate. The length of the bar 34 and the selection of the pivot point 36 are such that the mirror 24 will rotate exactly the right amount to maintain image position on the viewing area during a focus maintaining operation. The gripping power of the split end 38 of the bar 34 is not great enough to prohibit tilting the mirror 24 through the gear train 26, 28, 30 when the mechanism of co-pending application Ser. No. 860,857 is employed. It should be apparent that the stabilizing bar 34 or the gear train 26, 28, 30 described previously may be used without the other to perform the desired function. Also it should be quite apparent that together they reinforce each other and assure more accuracy in maintaining placement of the image on the viewing area.

Although the preferred embodiment comprises a system wherein the mirror is intermediate the slide and objective lens, it should be apparent that a projection system with the objective lens intermediate the slide and mirror could easily be constructed using the principles of this invention. In that case, the optical path from the lens to the viewing area would be altered in response to changes in slide position rather than, as in the preferred embodiment, the optical path from the slide to the projective lens.

Thus a novel focus maintaining system has been described. The system functions simply, rapidly and accurately in responding to changes in slide configuration. Furthermore the focus maintenance system operates without changing the image position on the viewing area.

It should be understood, of course, that the foregoing disclosure relates to only a preferred embodiment of the invention and that many modifications or alterations may be made without departing from the spirit and the scope of the invention as set forth in the appended claims.

Having thus described the invention, what is claimed is:

1. A focus maintaining slide projector comprising:
a radiation source mounted on said slide projector;
an objective lens mounted on said slide projector;
means for mounting a slide in a predetermined horizontal plane intermediate said radiation source and said objective lens;
planar reflecting means, rotatable about an axis, for folding light from said radiation source, after passing through said slide, to said objective lens thereby defining an initial optical path length from said slide via said reflecting means to said objective lens;
appraisal means for determining changes in the plane of said slide that alter said initial optical path length; and motive means responsive to said appraisal means for moving said reflecting means to restore said initial optical path length, thereby substantially maintaining initial focus of said slide projector; and means responsive to said movement of said reflecting means for rotating said reflecting means such that image position on a viewing area is maintained.

2. A focus maintaining film projector comprising:
a radiation source mounted on said projector;
an objective lens mounted on said projector;
means for mounting substantially planar film in a predetermined plane intermediate said radiation source and said objective lens;
planar, rotatable reflecting means for folding light from said radiation source, after passing through said film, to said objective lens thereby defining an initial optical path length from said film via said reflecting means to said objective lens at which the projected image is in focus;
appraisal means for determining changes in the plane of said film that alter said initial optical path length;
motive means responsive to said appraisal means for moving said reflecting means to restore said initial optical path length, thereby substantially maintaining the focus of said projector; and
means responsive to said movement of said reflecting means for rotating said reflecting means and to substantially maintain the position of said projected image on a viewing area.

3. A focus maintaining slide projector comprising:
a radiation source mounted on said slide projector;
an objective lens, having an optical axis, mounted on said slide projector;
means for mounting a slide in a horizontal plane intermediate said radiation source and said objective lens;
a planar reflecting means for folding light from said radiation source, after passing through said film, to said objective lens thereby defining an initial optical path length from said film via said reflecting means to said objective lens at which a projected image is in focus, said reflecting means being both rotatable about an axis intersecting and perpendicular to said optical axis and mounted for reciprocating vertical movement;
appraisal means for determining changes in the plane of said slide that alter said optical path length,
motive means responsive to said appraisal for vertically moving said reflecting means to restore said optical path length, thereby substantially maintaining initial focus of said slide projector; and
means responsive to said vertical movement of said reflecting means for rotating said reflecting means such that image position on a viewing area is maintained.

References Cited

UNITED STATES PATENTS

| | | | |
|---|---|---|---|
| 2,113,397 | 4/1938 | Croft | 353—77 |
| 2,851,922 | 9/1958 | Rosin | 353—76 |
| 3,148,853 | 9/1964 | Field | 350—255X |
| 3,342,102 | 9/1967 | Maxon | 353—101X |
| 3,472,588 | 10/1969 | Dine et al. | 353—76 |

HARRY N. HAROIAN, Primary Examiner

U.S. Cl. X.R.

353—69, 98